Nov. 26, 1963  A. C. PETERSON  3,111,992
ROTOR SUSTENTATION AND PROPULSION MEANS OF JET TYPE
Filed Feb. 25, 1960

INVENTOR

Adolphe C. Peterson

Nov. 26, 1963  A. C. PETERSON  3,111,992
ROTOR SUSTENTATION AND PROPULSION MEANS OF JET TYPE
Filed Feb. 25, 1960  3 Sheets-Sheet 2

INVENTOR

Nov. 26, 1963  A. C. PETERSON  3,111,992
ROTOR SUSTENTATION AND PROPULSION MEANS OF JET TYPE
Filed Feb. 25, 1960  3 Sheets-Sheet 3

INVENTOR

United States Patent Office 3,111,992
Patented Nov. 26, 1963

3,111,992
ROTOR SUSTENTATION AND PROPULSION MEANS OF JET TYPE
Adolphe C. Peterson, 4623 Bruce Ave. S., Minneapolis, Minn.
Filed Feb. 25, 1960, Ser. No. 11,049
15 Claims. (Cl. 170—135.4)

My invention relates to rotor and sustentation and propulsion means which is generally of the helicopter type and is propelled chiefly by jet engine means, and it is called: Rotor sustentation and propulsion means of jet type.

In general the objects are to provide such means of the type stated for aircraft use, which means shall generally be lower in first cost, lower in operational cost, and which shall have certain especial advantages hereinafter especially enumerated. A chief object of this invention is the provision of a form of rotor propulsion means which, because of its especial and novel form of combustion and utilization of fuel, will provide an increased efficiency in that use of fuel for the propulsion of the rotor means and therefore also for the use of fuel in the propulsion of the aircraft on which the device is used. The efficiency in the use of fuel results in this invention from two characteristics in the utilization of fuel, one, that the fuel is used only in such a manner that all the force is completely effective for forward propulsion of the aircraft; second, that the force of the jet expulsion by its reaction is counteracted by the rearward propulsion or thrust effect of the deepened phase of the blade pitch, in the rotation, so that thus both forces are simultaneously effective for forward propulsion.

Another important advantage provided by this invention is the fact that the cycle and system of the device in itself provides automatically for the changes in phases in the blade pitch and for the changes in phases in jet propulsion in each rotation of a rotor. A very important advantage consists in the fact that the system provides inherently a method of control of the propulsive thrust upon the aircraft which is effective in use of the aircraft, either in single units of the device or in use of a multiple number of the units, this directional control of the units being especially effective for control to enable hovering of the aircraft or slow descent or landing and take-off of the aircraft.

In general the object is the provision of better, less costly and more easily controlled aircraft. The device is applicable in use for aircraft which are entirely rotor sustained or for such aircraft as are sustained by any combination of this device and any fixed wing sustentation means or for such aircraft as are convertible from one form of sustentation to another form. In the description and illustration of my invention, like characters refer to like parts in the several forms, in so far as is practicable. The principal devices and combinations of devices constituting my invention, are as hereinafter defined in the claims and as described. Referring to the drawings:

Figure 1:
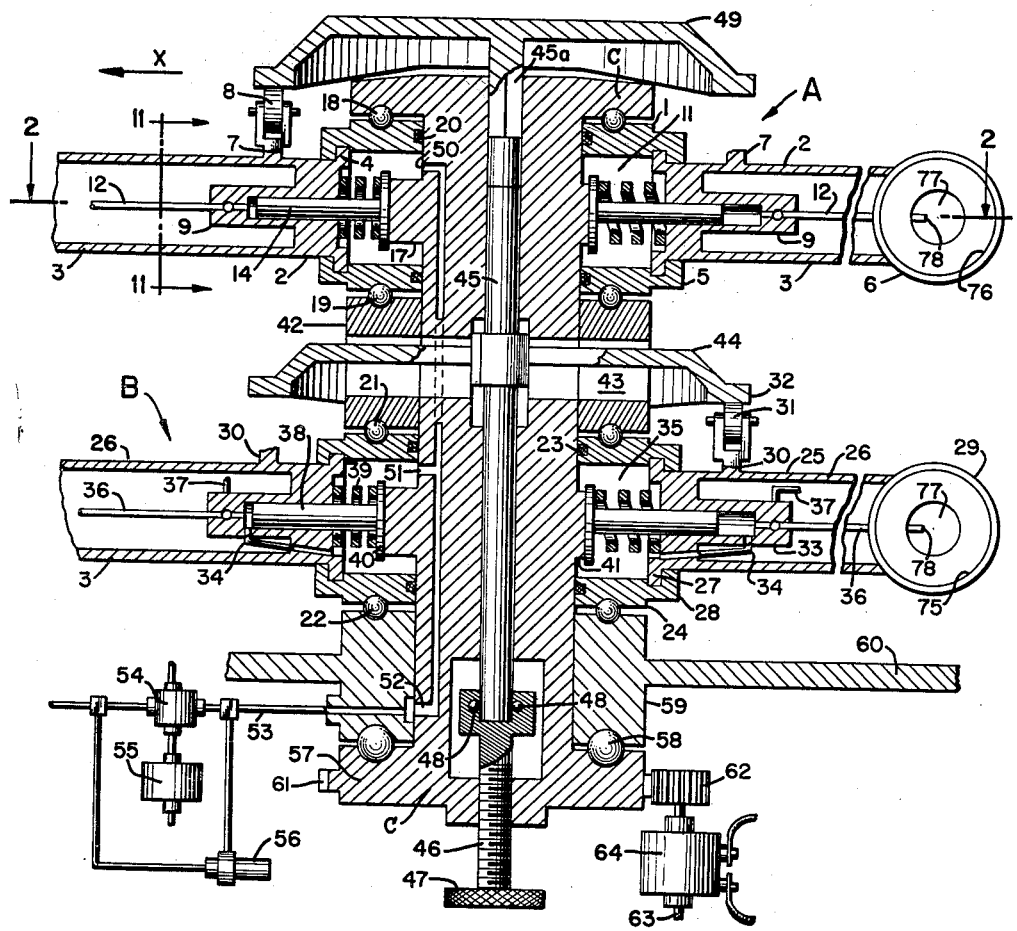
FIGURE 1 is a view chiefly in vertical section through the vertical operating axis of one so-called twin unit which consists of two rotors coaxially mounted on a single mounting plyon, some parts being shown in full vertical side elevation, some parts being broken away, the section being a section on the lines 1—1 of FIGURES 2 and 7.

Referring first to the device as illustrated in FIGURES 1 to 8 inclusive, and first especially to FIGURES 1 to 5 which illustrate in detail elements of one rotor unit, there is there illustrated a rotor unit which embodies as chief elements or units one upper rotor A and one lower rotor B and a mounting plyon C whereon the two rotors A and B are rotatively mounted to rotate on the same axis extended, one rotor rotating in a plane above the other and so separated that rotation of neither rotor interferes with rotation of the other. It will be noted that the two rotors of a rotor unit, this being otherwise designated a twin rotor unit, rotate oppositely, each to the other, in direction rotatively.

The rotor A consists primarily of a central or hub element 1 which has mounted in it the root ends 2 of four airfoil blades these blades being mounted so that their airfoil blades 3 extend one along each of four radii of the rotor, these radii being equidistantly located in the circle about the axis of the rotor. The root ends of blades have flanges 4, one on each blade, these flanges being mounted to be held by hub caps 5 one for each blade, the mounting being such that the individual blades are each oscillative on their longitudinal axis in the rotor hub mounting. Each blade in the rotor has a ram-jet engine 6 fixed on the extreme end of the blade or at any selected location on the blade remote from the root end of the blade.

Each blade 3 near its root end has fixed on it to be oscillative with the blade an arm 7 which at its outer end bears mounted in it a roller 8, this roller being adapted to bear upwardly against the lower face of an associated wabble plate hereinafter designated. Each root end of an airfoil blade has fixed internally in it as near its inward end as is possible, a fuel injection pump, each designated as 9 and this fuel pump has a suction pipe and inlet means generally designated 10 and by which the pump may draw fuel from a fuel chamber 11 formed within the hub element 1 and between the latter and the adjacent surface of the mounting pylon. Each fuel pump also has a fuel delivery means designated 12 by which fuel may be discharged from the pump during one phase of its cycle of pumping operation to the associated ram-jet engine of the blade. Each fuel pump 9 also may have discharge through a release means generally designated 13 and which serves for adjustment of the quantity of fuel delivery to a ram-jet engine per cycle of operation. Each fuel pump 9 has reciprocable therein a fuel pump plunger, each designated 14 and the latter is reciprocable by means of a coil spring 15 to move the plunger outwardly and by means of an attached flange or cam contact disk 16 which bears against the outer surface of an eccentrically disposed cam 17, the latter being fixed on the mounting pylon C to be transversely of the axis thereof and to be eccentric to the axis of the mounting pylon C.

The rotor A is rotatable by its hub element 1 on the mounting pylon C in the horizontal plane transversely of the mounting pylon and this rotation is on the ball bearings 18 and 19. Packing means 20 is provided between the hub element 1 and the outer surface of the mounting pylon C in planes in the upper part of the hub element 1 also in the lower part of the hub element 1, this packing providing for effective prevention of leakage from the fuel chamber 11. Any suitable packing means, such as is well known, may be utilizable for this purpose, it being noted however that the packing is necessary to resist pressure of the fuel at only a relatively low pressure, say a pressure of five to ten pounds or even less. The fuel pumps on the other hand provide for delivery of the fuel at high pressure to the ram jet engines, and this pressure may be as high as 100 to 500 pounds or more this being as may be determined for any particular construction.

The rotor B is rotatable by its hub element 24 on the mounting pylon C in the horizontal plane transversely of the mounting pylon but in a plane below that of the plane of the rotor A, and this rotation is on the ball bearings 21 and 22. Packing means 23 is provided between the hub element 24 and the outer surface of the mounting pylon C in planes in the upper part of the hub element 24 and also in the lower part of the hub element 24, this packing providing for prevention of leakage, the conditions being as is described in connection with the rotor A.

The rotor B consists primarily of a central or hub element 24 which has mounted in it the root ends 25 of four airfoil blades these blades being mounted so that their airfoil blades 26 extend one along each of four radii of the rotor, these radii being equi-distantly located in the circle about the axis of the rotor. The root ends of blades have flanges 27, one on each blade, these flanges being mounted to be held by the hub caps 28 one for each blade, the mounting being such that the individual blades are each oscillative on their longitudinal axes in the rotor hub mounting. Each blade in the rotor has a ram-jet engine 29 fixed on the extreme end of the blade or at a suitable selected location on the blades.

Each blade 26 near its root end has fixed on it to be oscillative with the blade an arm 30 which at its outer end bears mounted in it a roller 31 this roller being adapted to bear upwardly against the lower face of an associated wabble plate 32 hereinafter further described. Each root end of an airfoil blade has fixed internally in it as near its inner end as is possible, a fuel injection pump each designated as 33 and each such fuel pump has a suction pipe and inlet means generally designated 34 and by which the pump may draw fuel from a fuel chamber 35 formed within the hub element 24 and between the latter and the adjacent surface of the mounting pylon C. Each fuel pump also has a fuel delivery means designated 36 and by which fuel may be discharged from the pump during one phase of its cycle of pumping operation to the associated ramjet engine of the blade. Each fuel pump 33 also may have discharge through a release means designated generally as 37 and which serves for adjustment of the quantity of fuel delivery to the ram-jet engine per cycle of operation. Each fuel pump 33 has reciprocable therein a fuel pump plunger each designated 38 and the latter is reciprocable by means of a coil spring 39 to move the plunger outwardly and by means of an attached flange or cam contact disk 40 which bears against the outer surface of an eccentrically disposed cam 41 the latter being fixed on the mounting pylon C to be transversely of the axis thereof and to be eccentric to the axis of the mounting pylon C.

There is mounted on the mounting pylon C and transversely thereof and between the hub elements 1 and 24 an annular fixture 42 which may be fixed firmly to the mounting pylon C by welding thereto or shrinking thereon or by any means suitable for that purpose and this fixture serves to separate the hub elements 1 and 24 and provide for interposition of the ball bearing means as shown. This fixture 42 and the adjacent parts of the mounting pylon C have formed transversely therethrough an open passage or slot 43 through which there are passed arms 44 extending diametrically away from the wabble plate adjustment rod 45 and fixed to the latter at their inner ends and fixed to the wabble plate 32 at their outer ends so that this means provides for movement vertically of the wabble plate 32 by means of the vertical rod 45 which is passed axially through the mounting pylon C at its axial center, this rod 45 being freely movable in either direction vertically within the pylon C by means at the lower end thereof consisting of the screw member 46 rotatable by the manual lever 47 and the ball bearing means 48 at the upper end of the screw member 46, the screw member being rotatable in the mounting bearing therefor formed and fixed below the lower end of the mounting pylon C to the latter so that the relative movement axially may serve to move the rod 45 vertically either upwardly or downwardly, this adjustment movement being unnecessary except for change of the depth of oscillative movement or cycle phase of the airfoil blades of rotors.

The upper end of the adjusting rod 45 bears fixed thereto another wabble plate 49 which serves to contact the rollers of the blades of the upper rotor of the rotor unit. The two wabble plates designated move in the adjustment simultaneously as a unit so that thus both of the rotors are simultaneously and similarly affected for the change of depth of pitch change.

The fuel chambers 11 and 35 have connection by means of ports 50 and 51 with a vertical channel or conduit 52 by which fuel may be received from the supply conduit 53 at the lower end of the mounting pylon C and the conduit 53 receives fuel as pumped under the low pressure of say five to ten pounds by a supply pump 54 this pump being operated and controlled by an electric motor and control therefor generally designated 55, and having a pressure controlled safety valve set at say five to ten pounds and designated 56, so that fuel pressure in the pylon conduits is never changeable but is at all times maintained at the same pressure.

The mounting pylon C at its lower end has a flange 57 fixed rigidly thereto or formed therewith and this bears upwardly by means of ball bearing means 58 against the fixture bearing 59 which is fixed rigidly in the fuselage structure 60. The flange 57 has a spur gear 61 formed thereon which is in engagement with a small spur gear 62 fixed on armature shaft 63 of electric motor 64. The latter may be operated under control of the pilot to turn the flange 57 and with it the pylon C and the wabble plates 49—32. The wabble plates are each fixed or secured against rotation relatively to the mounting pylon C so that whenever the latter is caused to be rotated through a part of one rotation or more the wabble plates 49 and 32 will also turn through the same degrees of rotation, this equal degree of rotation procuring, after turning of pylon C, the similar relative positions of the wabble plates as compared with the mounting pylon C and the eccentrics 17 and 41 thereon, and the result of this is that the rotors and their ram-jet engines will perform similarly relatively to the mounting pylon C and relatively to each other, but that the direction of the propulsion thrust will be altered according to the degree of turning of the mounting pylon C by means of the electric motor 64. It is contemplated that the latter will have the usual reversible ability of control motors and that any control in connection with it procures turning adjustment according to the desire of the pilot and his manual control thereof. The wabble plates each are by their lower surfaces angularly positioned relatively to the vertical axis of the mounting pylon C, so that the lower surfaces of each act as cam surfaces to cyclically depress the associated rollers 8 and 31 as they travel under the respective wabble plates, such depression occurring once for each rotation of the associated hub element 1 or 24. The depression movements of the rollers 8 and 31 is such as to periodically once each cycle depress the trailing edge of the associated blades in succession, the subsequent raising of the trailing edges occurring also cyclically in succession in diametrically opposite phases, the airfoil blades being adapted by the trailing portions of blades to automatically effect the raising action. This raising action may however be effected by any means such as may commonly be used for such a purpose.

Figure 5:
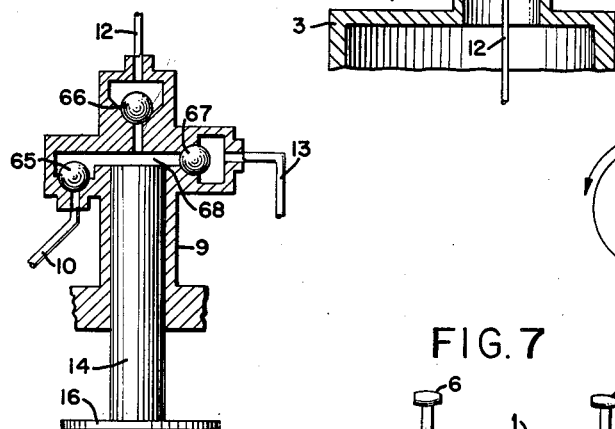
FIGURE 5 is an enlarged detail view in section through the fuel pump means of one blade of one of the rotors, each blade of each rotor having one of these fuel pumps.

Referring to FIGURE 5, a detail enlarged view of one of the fuel pump devices (without the actuating means), of the rotor A, it will be seen that suction from means 10 is through a port controlled by non-return valve 65, that fuel delivery is by a port controlled by non-return valve 66, and that release by-passing of fuel by release means 13 is by a port controlled by non-return valve 67. The latter designated port labeled 68 is a metering port which is of a somewhat restricted cross-sectional area, and it should be especially noted that all of such ports 68, the metering ports for release of fuel, are as to all of the fuel injection ports, in each of the rotors, of exactly the same capacity for passage of fuel so that when the pressure in the common release conduit is the same for all pumps, there will then be exactly equal release flow of fuel when that is permitted by the governing means which is especially illustrated in FIGURE 4. In the latter figure, the control valve 69 normally is seated on the valve seat 70 and it is lifted therefrom by a governor lever 71 which acts leftwardly (FIGURE 4) against the flange or disk 72 on the head of the valve 69, the lifting of said valve 69 occurring, however, only when there is enough centrifugal force acting upon the weight 73 (a part of governor lever 71) to unseat the valve 69 against the pressure of the coil spring 74 which is a compression spring acting rightwardly (FIGURE 4) against the disk head 72 of the valve. It is contemplated that the governor fuel control means shown will become effective to unseat the valve 69 and permit release flow of fuel only when the associated hub element 1 is rotating at a speed which is what may be described as the maximum safe rotational speed of the hub element 1 and its associated blades. Thus the rotor A will at all times have what is near its maximum safe rotational speed, but never more than that, and the flow of fuel to ram-jet engines will be as necessary to procure this safe speed of rotation, and it will follow that such flow will automatically be determined by the driving power necessary to propel the rotor under the conditions of propulsion, that is pitch angle of blades in the deep pitch phases, which condition will be determined at any time by the vertical position of the control rod 45.

Figure 3:
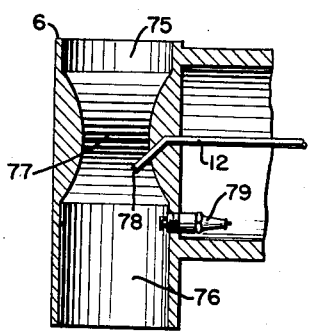
FIGURE 3 is a section through the longitudinal axis of one of the ram-jet engines on the tip end of a blade of one of the rotors, the section being on a line axially of one such engine.
Figure 4:
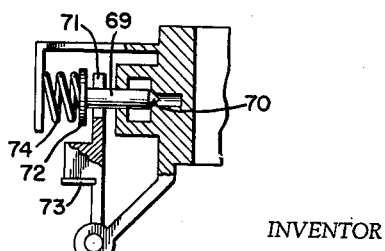
FIGURE 4 is a detail section on the line 4—4 of FIGURE 2, showing the fuel release control valve and its centrifugally operated actuation means.
Figure 2:
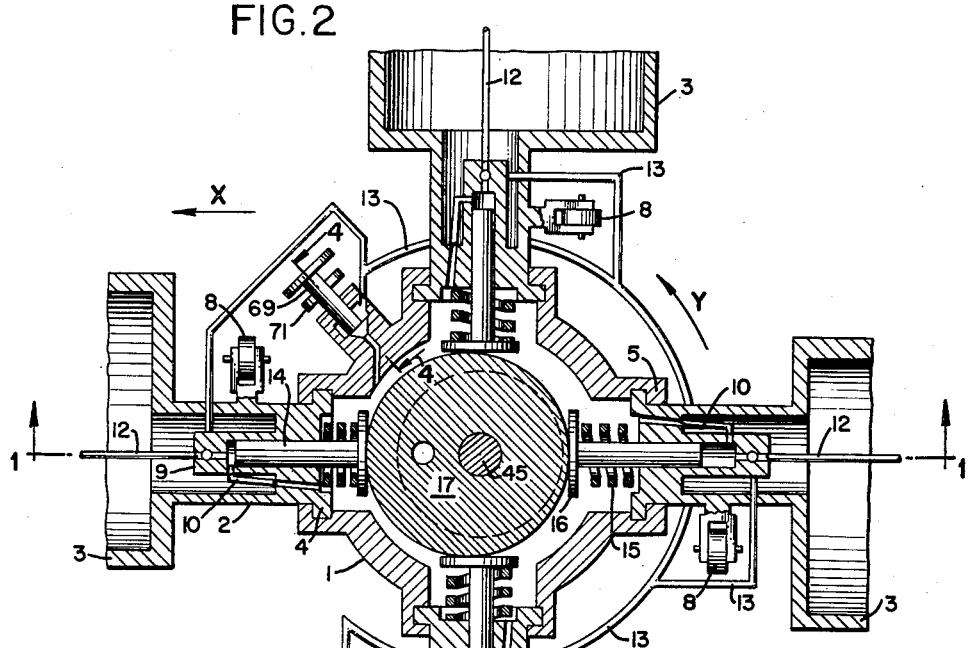
FIGURE 2 is a view chiefly in horizontal section transversely to the plane of FIGURE 1, on the line 2—2 of FIGURE 1 through the chief elements of one rotor of the twin rotor unit, some parts in diagrammatic form, some parts broken away, some in plan view.

The control rod 45 has squared portions 45a which move vertically in squared portions of the bore in which rod 45 moves vertically, so that the wabble plates and mounting pylon C are thereby maintained in their relative positions rotationally. Referring to FIGURE 3 which is illustrative of the general form or nature of each of the ram-jet engines of each of the rotors A and B, the ram-jet engine has an air inlet 75, a gas discharge 76, the restricted area transversely as at 77, the fuel injection nozzle 78, and the spark plug 79. Each of these features and the general nature and construction of each of the ram-jet engines will be contemplated to be that which is generally adopted for such ram-jet engines and which is known to be the form best suited for effective propulsion and economy of fuel. The fuel nozzles individually receive fuel under pressure which may be even as high as one thousand pounds by way of its individual associated fuel delivery means 12 between it and the associated individual fuel pump 9. It is contemplated that the description of the fuel governor control means will apply also to the rotor B and that this control is as for rotor A, detailed showing of this for rotor B being specified as being similar in features and performance to that of the fuel control for the rotor A, as above described.

Figure 6:
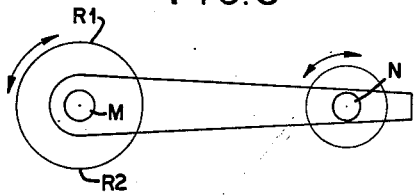
FIGURE 6 is a diagrammatic plan view of an aircraft embodying two of the rotor units, showing in diagram the relative action of a propulsion system of one rotor unit.
Figure 7:
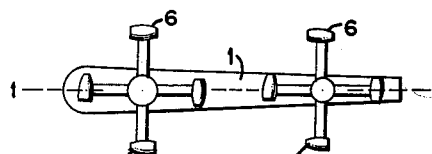
FIGURE 7 is a diagrammatic view also of such an aircraft, but to show chiefly the mounting of the ram-jet engines on tips of blades of rotors of two rotor units, one such unit at each end of the aircraft.
Figure 8:
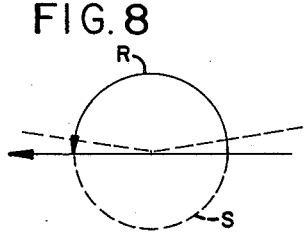
FIGURE 8 is a diagram illustrating the relative action of the ram-jet propulsion of a rotor blade and the deepened pitch phase of propulsion action of an opposite blade of the same rotor of a unit.

A general description of operation is now given, as follows. The rotor A rotates in the counterclockwise direction looking downwardly from above, and the rotor B rotates in the clockwise direction, similarly viewed. In FIGURE 8 is shown diagrammatically phases of the combustion cycle in one ram-jet engine, and in such cycle the ram-jet engine inducts air at its air inlet from atmosphere and fuel is sprayed into the air in the engine from its associated injection pump 9 and combustion occurs to procure effective thrust rearwardly and oppositely to the direction of the arrow R in FIGURE 8, while at the same time there will be rearward propulsion by the blades passing through the opposite phase (diametrically) in which phases the said opposite blades will have deepened pitch angle. FIGURE 8 diagrammatically illustrates such action with respect to one rotor. Such action, combustion thrust effect, and pitch angle propulsion effect, is similarly as to the other rotor of the twin rotor unit (FIGURE 1). Thus all blades of one rotor A have ram-jet engine thrust rearwardly of the blade, as the blades move forwardly in the forward phase of the rotation, and at the same time, but in opposite phases for each blade, there is deepened pitch angle when the blade is moving rearwardly with respect to the forward translational movement or travel of the aircraft, and that rearward movement with deepened pitch angle results in strong rearward thrust of the blade and strong reactional thrust in the forward direction upon the aircraft. There are similar thrusts and effect in the rotor B of the twin rotor unit (FIG. 1). Referring to FIGURE 6 there is a twin rotor unit M having two rotors, and a twin rotor unit N having two rotors, one twin rotor unit being at front end of the aircraft and the other being near the rearward end of the aircraft. Each twin rotor unit will thus have ram-jet engine propulsional (rearward thrust) effect rearwardly of the aircraft at each side of the unit, as depicted by arrows R1 and R2, and there will be both rearward jet thrust at each side of that axis and also rearward blade deepened pitch angle thrust rearwardly of the aircraft, at each side of the axis of the twin rotor unit, and each such unit. By means of the electric motor 64 and its control by the pilot, the relative direction of such thrusts in each twin rotor unit, may be changed so as to make the direction of thrust in either of the twin rotor units in any direction horizontally across the axis of the unit so that thus propulsion may be at any angle horizontally to the travel direction of the aircraft, so as to thereby effect directional control of the movement of the aircraft. By the same directional control of the thrust of each twin rotor unit, the thrusts effective on the aircraft may be caused to be neutralized, and the effect will be hovering ability of the aircraft without translational movement thereof.

The pilot may by turning of member 46 by lever 47 cause relative movement vertically of the control rod 45 and thereby lesser or greater deepened pitch angle in the deepened pitch phases, and thus effect greater propulsional thrust and also upward lift on the aircraft, and that effect will cause greater need for fuel flow to the ram-jet engines, and thereby rotational speed of rotors will be maintained, and there may then be climbing ability and also increased travel speed (or travel effect will be neutralized as desired). By the electric control of the fuel supply pump fuel flow may be caused to cease, as desired by the pilot. It will be understood that each rotor of each of the twin rotor units will have the governor centrifugal speed control of the fuel flow, each rotor having its individual governor control as described in connection with a rotor A.

Figure 9:
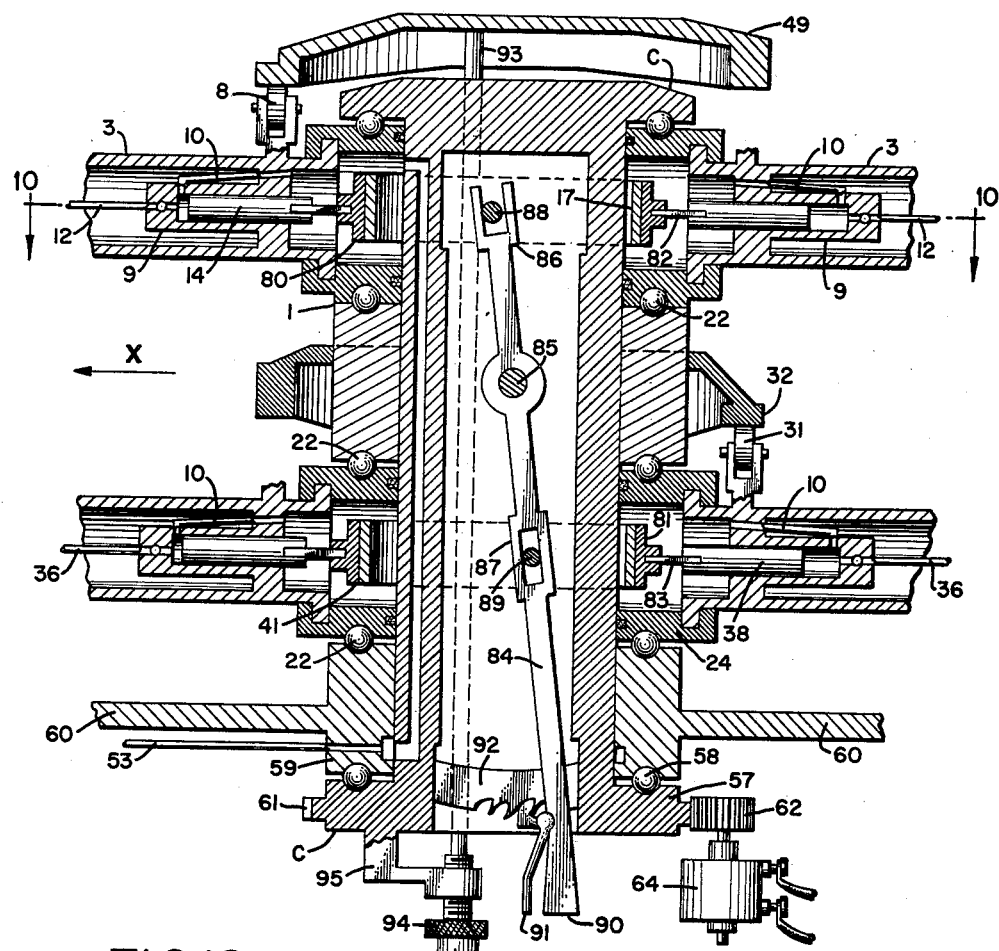
FIGURE 9 is a vertical section through the plane of the axis of a rotor unit of a somewhat modified type of rotor unit utilizing the same propulsion system as in the first form illustrated.
Figure 10:
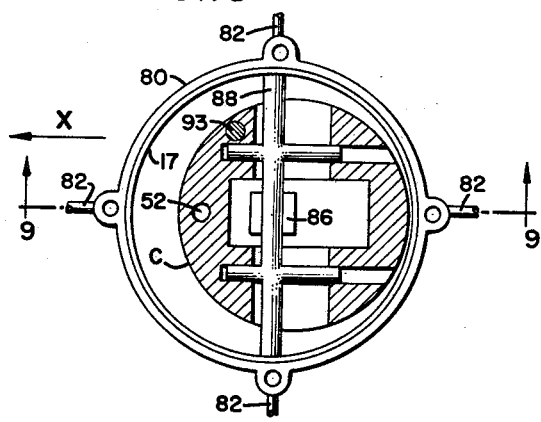
FIGURE 10 is a horizontal section on the line 10—10 of FIGURE 9 to show in detail the means for adjusting the eccentric position of one eccentric for operation of a fuel pump means of one rotor.
Figure 11:
FIGURE 11 is vertical section on the line 11—11 of FIGURE 1.

Referring now to the form of my device shown in FIGURES 9–10, this form is generally similar to the first form shown, except that fuel-plunger reciprocation is effected by eccentrics and eccentric straps thereon, such straps designated 80 and 81, and flexibly hinged connecting rods 82, 83, between the eccentric straps and the plungers. Control of fuel is in this form effected by movement transversely of each eccentric across the axis of the mounting pylon C, this control movement being effected by a control lever 84 hinged at 85, and having yokes 86, 87 engaging horizontal transverse rods 88, 89, which latter are secured firmly in opposite sides of the associated eccentrics. The control lever 84 may be stationed by the pilot by means of handle 90 and secured by lever 91 acting on toothed rack 92. The wabble plates are in this form moved vertically, as in the first form, but by a pair of rods 93 (offset from the axis and one only shown) which pass vertically through the pylon C, and movable vertically by means of screw member 94 acting in bracket 95, the member 94 pulling downwardly on the flange 96 attached to the lower end of rod 93, there being one such screw member and control for each one of the rods 93. This form has the fuel supply pump as in the first form but this is not shown. The fuel pumps have the fuel supply and delivery means as in the first form, but do not have the fuel release and governor control therefor. The fuel delivery is thus in this form controlled by the control lever 84. This form may be used in units as in the first form, and except as stated will have elements and ram-jet engines, as in the first form, and the general operation will be substantially similar except as to the fuel control means described. Members 97 are fixed with the rod 88 and slide therewith and in slots formed therefor in the pylon C so that by their movement transversely of pylon C they will guide the movement of the eccentric 17, the latter being thus held in its horizontal position relatively to the pylon C. The eccentric 41 of the rotor unit B will by a similar means (not shown specifically) be held in its relative horizontal position in its adjustment movements.

The device which has been herein described is broadly of the type which is described in my patent issued October 1, 1957, Patent Number 2,808,115, but this is designed to have fuel supply upon a broadly different method and to be an improvement in some other respects over the device as disclosed in the designated patent. The arrows X in the drawings indicate, in each case, the direction of translational flight of the aircraft on which the rotor unit or rotor units may be mounted and the description of operation of the devices should be considered in relation to such direction of translational flight. Such direction of translational flight is however subject to change according to the change which will be procured at any particular time by the rotation adjustment of the pylon C.

While I have illustrated my device as having particular devices and combinations of devices therein, it is contemplated and intended that my invention as herein may be designed and constructed to be within the contemplation thereof while having other detailed devices and combinations of devices. It is contemplated, particularly that any device or means, such as are commonly known, may be used with my means to facilitate starting of the rotors in their rotation. In the smaller constructions the pilot may aid the starting movement of the rotor B by giving initial movement in the proper direction of rotation by his hand or any such means as are usually used for starting of small motors may be used as for instance the cord starting means sometimes used and as is well known. In larger constructions, any electric motor means may be added to aid starting. Wind blower means as used with airplanes, on the ground, may be used, or other ground power devices, as are known. If the rotor B is started, rotor A may automatically start by downdraft. Any initial movement produces fuel injection at a jet engine and combustion then aids in starting movement. Or any ground travel, as for instance, downhill, may aid the starting. In general, any ground devices such as are well known may be used. And in starting, lessening of pitch, by means provided, will facilitate starting movements.

What I claim is:

1. In an aircraft, a rotor mounting pylon mounted on an aircraft structure, an airfoil rotor having a rotor hub means rotatably mounted on the mounting pylon, air foil blades each secured at one end in the rotor hub means and extending generally radially from the rotor hub means in a plane transversely of the axis of the rotor hub means; a fuel conduit formed in the mounting pylon, a fuel reception chamber formed in the rotor hub means to be adjacent said mounting pylon and to be in communication with said fuel conduit in the mounting pylon; a plural number of fuel pumps each associated with one of said airfoil blades and fixed therewith to be carried thereby in rotation of the rotor hub means and blades, each said fuel pump having a discharge therefrom to an associated jet engine affixed to the associated airfoil blade at a location radially remote from said rotor hub means, each said fuel pump having an associated movable element by which fuel is inducted to the fuel pump from said fuel reception chamber in a part of its cycle of movement and by which in another part of its cycle of movement fuel is discharged to its associated discharge to a jet engine; a member affixed with said mounting pylon and adapted in the rotation of said rotor hub means about said mounting pylon to procure displacement of said movable element of the fuel pump for forcible ejection of fuel from the fuel pump and to the associated jet engine for admixture of the ejected fuel with air passing in said associated jet engine; means by which atmospheric air is inducted and passed through the jet engines for combustion with fuel discharged by the associated fuel pump to the jet engine; means for ignition of fuel charges to jet engines with the air passing through jet engines.

2. The device as defined in claim 1, and: the said displacements of movable elements of said fuel pumps by the member affixed with said mounting pylon being so phased in their fuel ejection movements as to effect fuel discharge to an associated jet engine of each fuel pump during a phase of the rotation of said rotor hub means about the axis of said mounting pylon when the associated airfoil blade is moving similarly in direction to the translational movement of the aircraft and so that thereby each said jet engine has combustion therein and jet discharge by said combustion in direction rearwardly as compared to said direction of translational movement of the aircraft.

3. The device as defined in claim 1, and: the said means by which atmospheric air is inducted and passed through said jet engines being further defined as an intake opening for each said jet engine, the said intake opening being directed forwardly of the direction of movement of the individual jet engine in movement of the rotor hub means about the axis of said mounting pylon.

4. The device as defined in claim 1, and: a means in association with said airfoil blades and in interactive relation with said mounting pylon to effect, in movement rotationally of the rotor hub means about said mounting pylon, deepened pitch angle phases of each said airfoil blade as it passes through the phase of movement on one side of said axis of the mounting pylon.

5. The device as defined in claim 1, and: the said displacements of movable elements of said fuel pumps by the member affixed with said mounting pylon being so phased in their fuel ejection movements as to effect fuel discharge to an associated jet engine of each fuel pump during a phase of the rotation of said rotor hub means about the axis of said mounting pylon when the associated airfoil blade is moving relatively similarly in direction to the translational movement of the aircraft and so that thereby each said jet engine has combustion therein and jet discharge by said combustion in direction rearwardly as compared to said direction of translational movement; and means in association with said airfoil blades and in interactive relation with said mounting pylon to effect, in movement rotationally of the rotor hub means about said mounting pylon, deepened pitch angle phases of each said airfoil blade as it passes through the phase of movement on one side of said axis.

6. The device as defined in claim 1, and: the said member affixed with said mounting pylon to effect displacement of said movable elements being more specifically defined as an eccentric eccentrically offset from the axis of said mounting pylon and eccentric strap means mounted about said eccentric, such eccentric strap means having operative inter-actuation with each of said fuel pump movable elements to effect the successive displacements of said movable elements for ejection of fuel in successive order cyclically by the rotation of said rotor hub means and said fuel pumps and their movable elements about said mounting pylon.

7. The device as defined in claim 1, and: the said member affixed with said mounting pylon to effect displacement of said movable elements being more specifically defined as a cam member affixed with said mounting pylon and adapted in the rotation of said rotor hub means and said fuel pumps about said mounting pylon to successsively effect displacement of said movable elements relative to said fuel pumps to thereby effect successive cyclical movement of said movable elements in regular order for ejection of fuel in cyclic order from said fuel pumps to each of their associated jet engines.

8. The device as defined in claim 1, and: a fuel release means from each of said fuel pumps, a common release conduit to which each said fuel release means may discharge, a governor means centrifugally affected by rotation of said rotor hub means to release fuel from said common release conduit to said fuel conduit in the mounting pylon, the said fuel release means from each of said fuel pumps being each of flow capacity equivalent to that of each of the others.

9. The device as defined in claim 1, and: a means in association with said airfoil blades and in interactive relation with said mounting pylon to effect, in movement rotationally of the rotor hub means about said mounting pylon, deepened pitch angle phases of each of said airfoil blades as it passes through the phase of movement on one side of said axis of the mounting pylon, and means in connection with said last named means to adjust the said means in relation to said airfoil blades to thereby effect alteration of the degree of deepened pitch angle of airfoil blades in the deepened pitch angle phases.

10. The device as defined in claim 1, and: the mounting of said rotor mounting pylon in said aircraft structure including rotational support of said mounting pylon by said aircraft structure, and means in operative interrelation with said mounting pylon to effect rotation on the axis of said mounting pylon in said rotational support of said mounting pylon and simultaneously similar rotation in degree of the said member effecting displacement of said movable elements of said fuel pumps.

11. The device as defined in claim 1, and: a means in association with said airfoil blades and in interactive relation with said mounting pylon to effect, in movement rotationally of the rotor hub means about said mounting pylon, deepened pitch angle phases of each said airfoil blade as it passes through the phase of movement on one side of said axis of the mounting pylon; the mounting of said rotor mounting pylon in said aircraft structure including rotational support of said mounting pylon in said aircraft structure and means in operative interrelation with said mounting pylon to effect rotation on the axis of said mounting pylon in said rotational support and simultaneously similar rotation in degree of the said last named means in association with said airfoil blades to effect deepened pitch angle phases of each said airfoil blades.

12. The device as defined in claim 1, and: the mounting of the mounting pylon including rotational support therefor, and; means to effect deepened pitch angle phases of airfoil blades in rotation thereof about said mounting pylon axis, and means in operative interrelation with said mounting pylon to effect rotation thereof on its axis in said rotational support and simultaneously to effect similar rotation in degree of said means to effect deepened pitch angle phases of said airfoil blades and similar rotation in degree of said member effecting displacement of said movable elements of said fuel pumps, to effect similarly related phase movements of said blades and said movable elements of said fuel pumps but in a changed directional propulsional effect as compared with said aircraft structure.

13. The structure as defined in claim 1, and: a pitch change means incorporated with said rotor hub means and operationally connected with said airfoil blades to cyclically impart such change movements to each said airfoil blade, each said airfoil blade having oscillative mounting of the blade for pitch change, the said pitch change means having timed relation with said member affixed with said mounting pylon and the displacements of said movable elements to cyclically impart deepened pitch angle to each said airfoil blade in cyclical order in periods in rotation of the airfoil rotor about the mounting pylon alternating with the flow of fuel to said jet engines as procured by said member and said movable elements and when said fuel does not flow to said jet engines.

14. In an aircraft, a rotor mounting means, an airfoil rotor having a rotor hub means rotatably mounted on the rotor mounting means, a plural number of airfoil blades, each said airfoil blade secured at one end in the rotor hub and extending generally radially from the rotor hub means; a conduit means formed in said airfoil rotor and in each said airfoil blade and a source of fuel under pressure delivering through said conduit means, each said airfoil blade having a discharge jet nozzle carried thereon at a location radially outwardly from the axis of rotation of said airfoil rotor and discharging in the plane of rotation of the airfoil rotor substantially in the direction of a chord thereof; a means interposed in said conduit means and operable in timed relation cyclically with the rotation of the airfoil rotor about the rotor mounting means and by which fuel flows under increased pressure timed thereby to each said discharge jet nozzle; means by which atmospheric air is inducted by an intake directed oppositely to direction of discharge from the jet nozzle and passed into a combustion chamber formed in the nozzle intermediately of said intake and the discharge from the nozzle; means to effect ignition of air and fuel in each said combustion chamber in each combustion period; means to supply fuel through said rotor mounting means and to said conduit means; a pitch change means incorporated with said rotor hub means and operationally connected with said airfoil blades to cyclically impart such change movements to each said airfoil blade, each said airfoil blade having oscillative mounting of the blade for pitch change, the said pitch change means having timed relation with said means interposed in said conduit means to cyclically impart deepened pitch angle to each said airfoil blade in cyclical order in periods of rotation of the airfoil rotor about the rotor mounting means alternating with the flow of fuel to said combustion chambers as procured by said means interposed in said conduit means and when said fuel does not flow under said increased pressure to said combustion chambers.

15. The structure as defined in claim 14, and: a means for change of the cyclic phases of supply of fuel under said increased pressure to said combustion chambers of said jet nozzles to change the location of said phases in the cycle of rotation of said airfoil rotor, for resultant change of the direction of horizontal thrust of the airfoil rotor in the plane of rotation.

References Cited in the file of this patent

UNITED STATES PATENTS

| | | |
|---|---|---|
| 2,620,882 | Morain | Dec. 9, 1952 |
| 2,654,995 | Ostroff | Oct. 13, 1953 |
| 2,714,803 | Abild | Aug. 9, 1955 |
| 2,766,579 | Gallo et al. | Oct. 16, 1956 |
| 2,808,115 | Peterson | Oct. 1, 1957 |